Oct. 15, 1940.   L. D. SOUBIER ET AL   2,218,456
APPARATUS FOR MOLDING PLASTIC MATERIALS
Filed Feb. 12, 1938   14 Sheets-Sheet 11

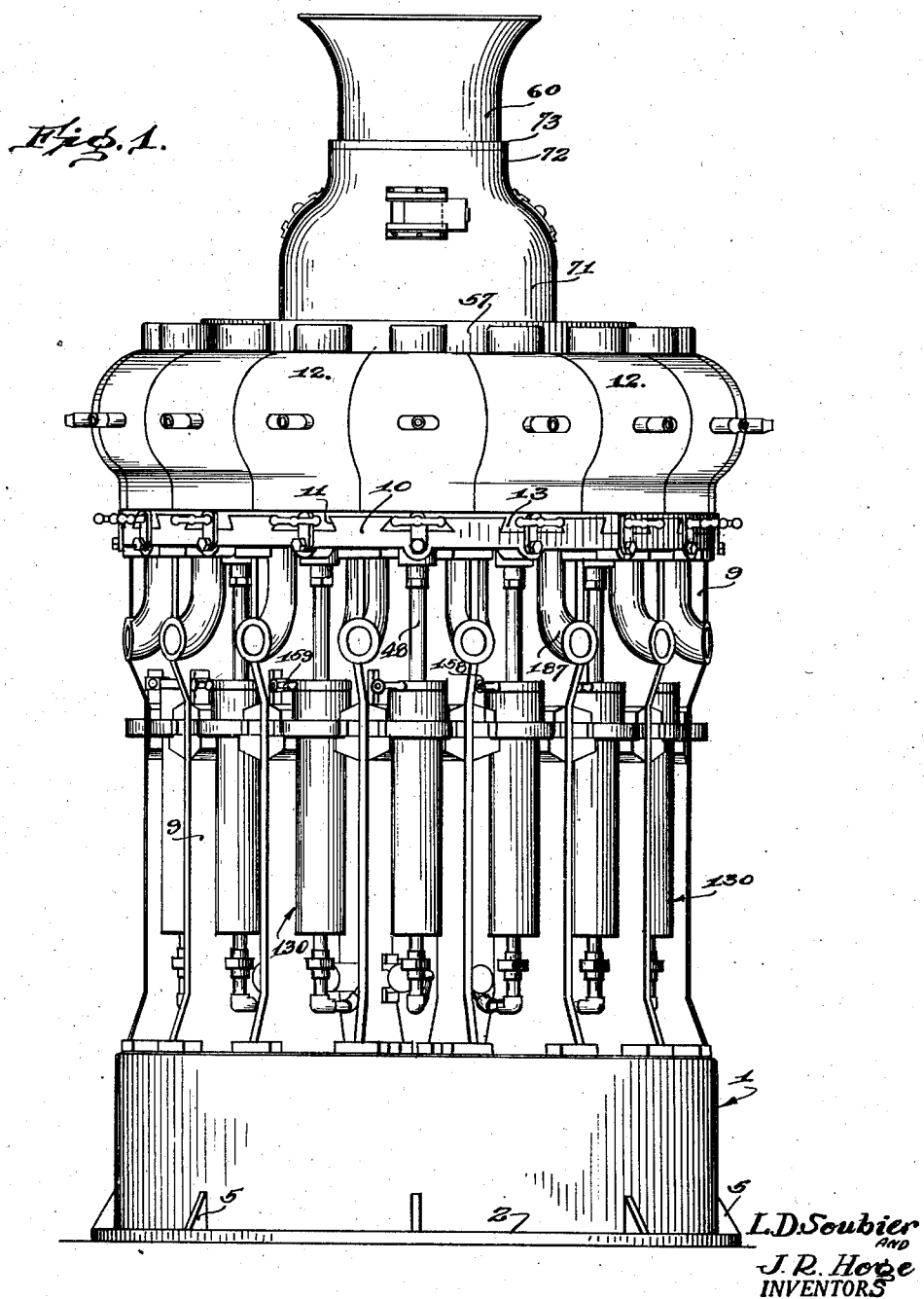

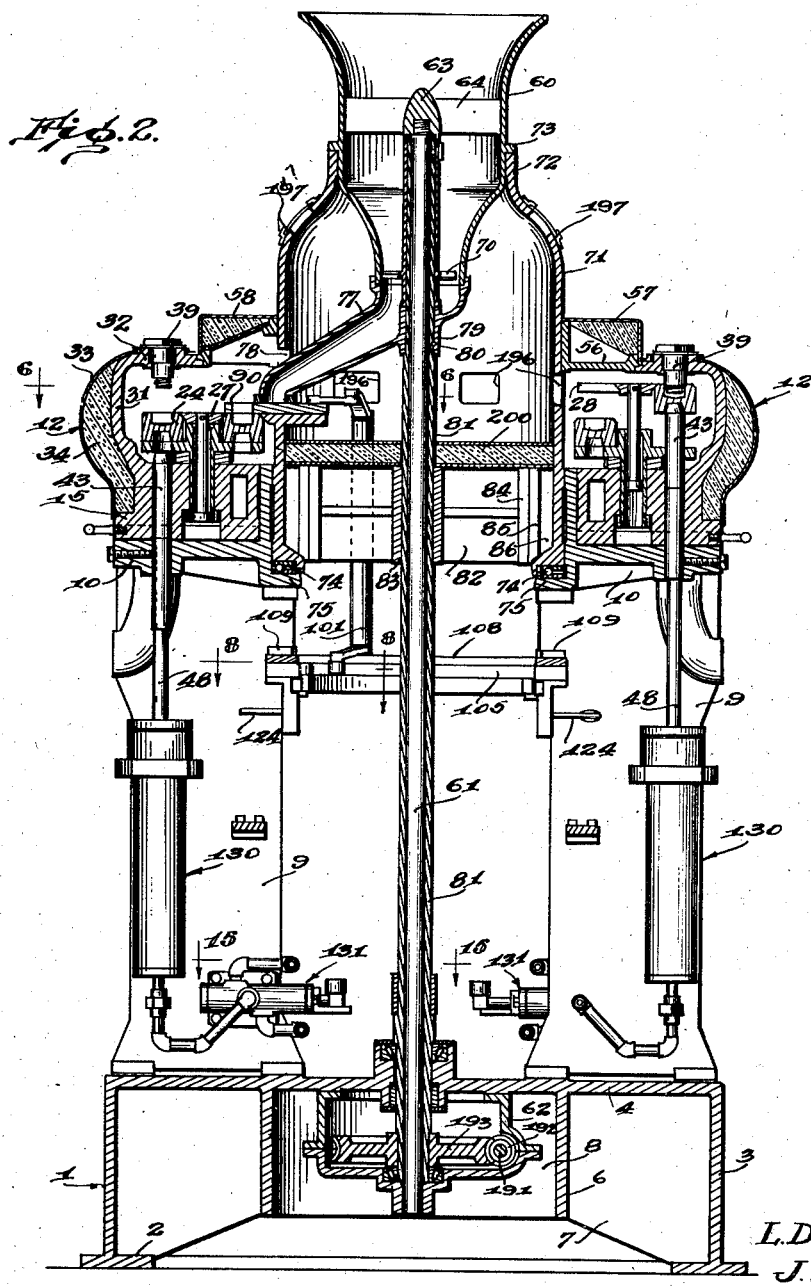

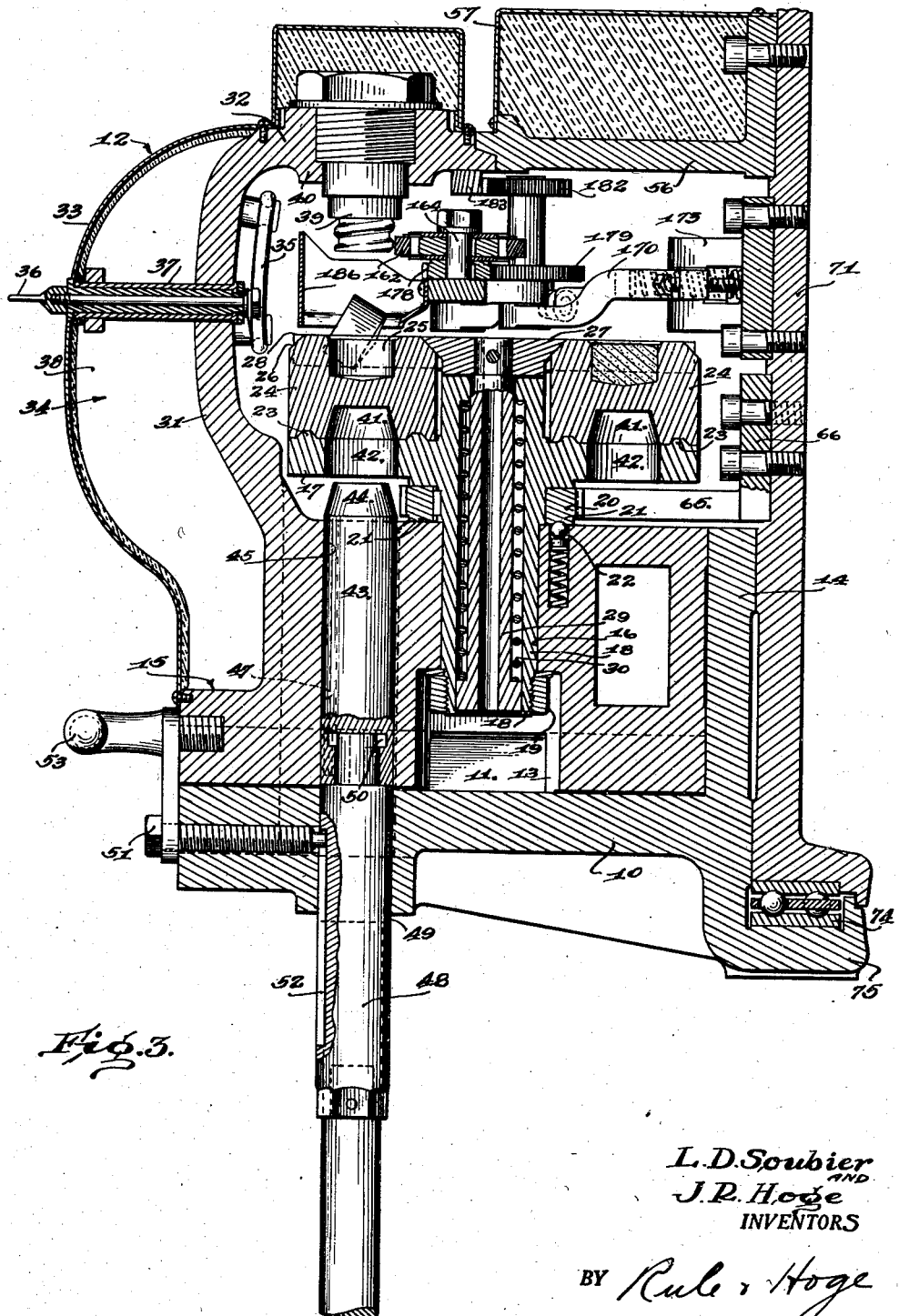

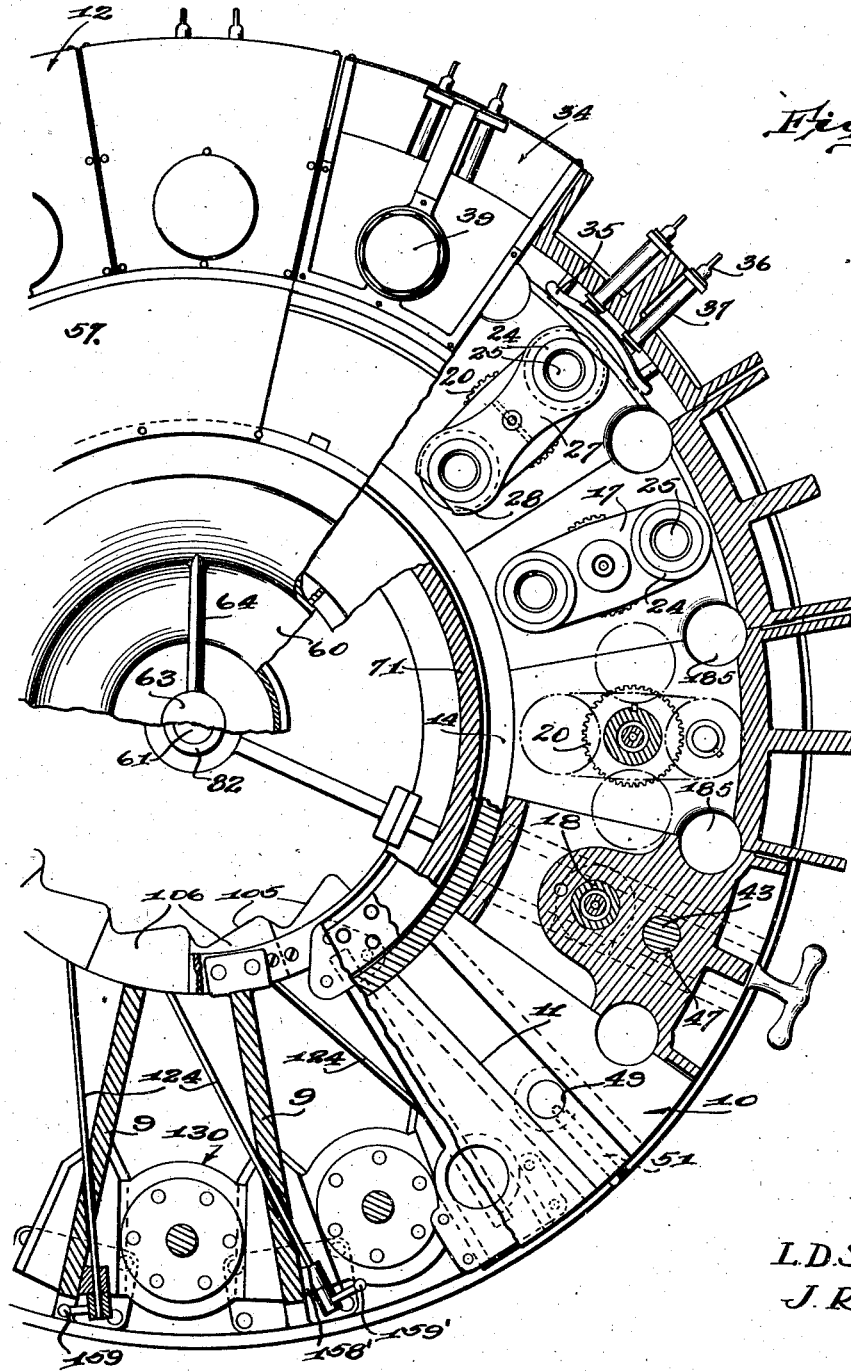

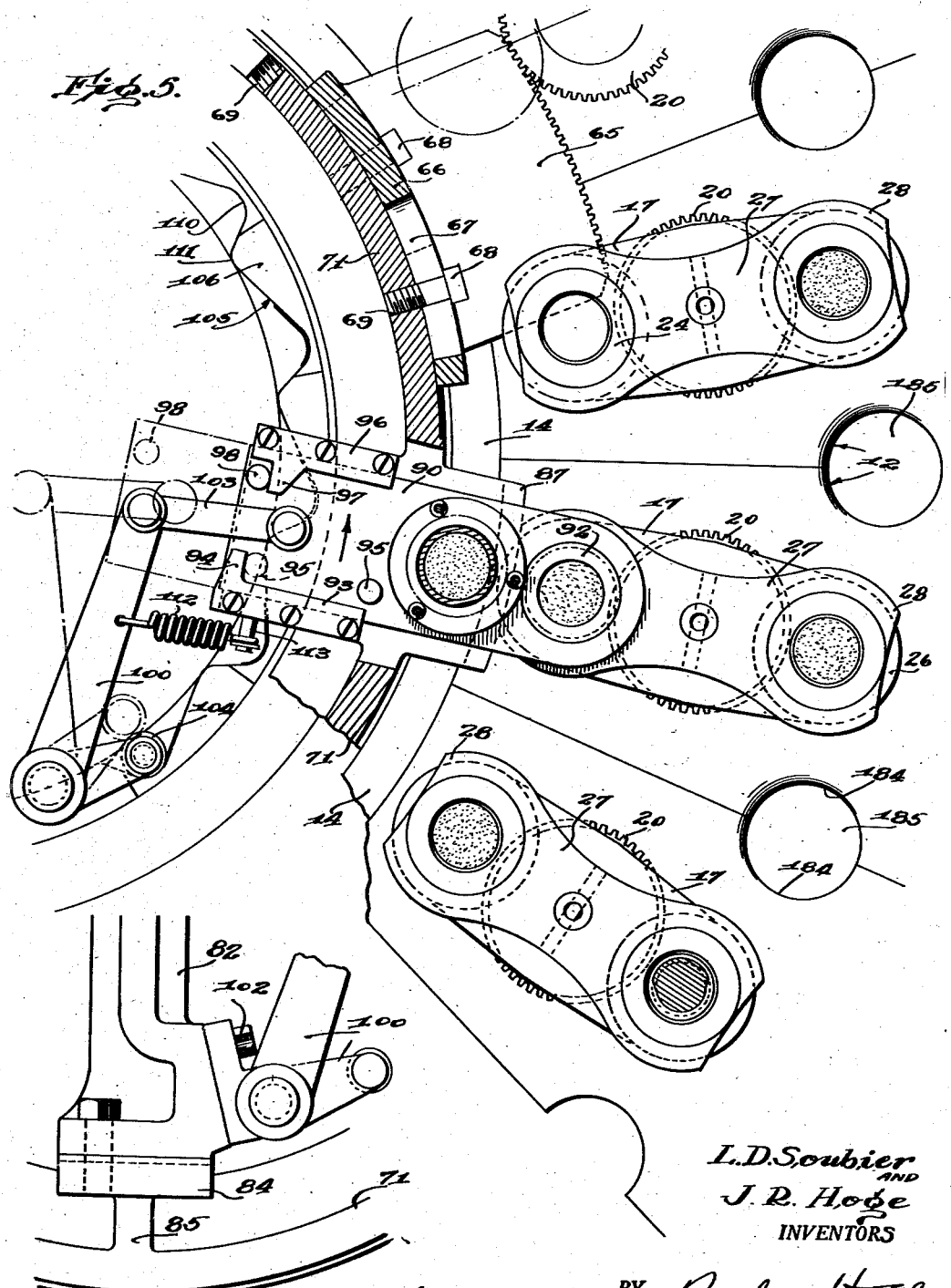

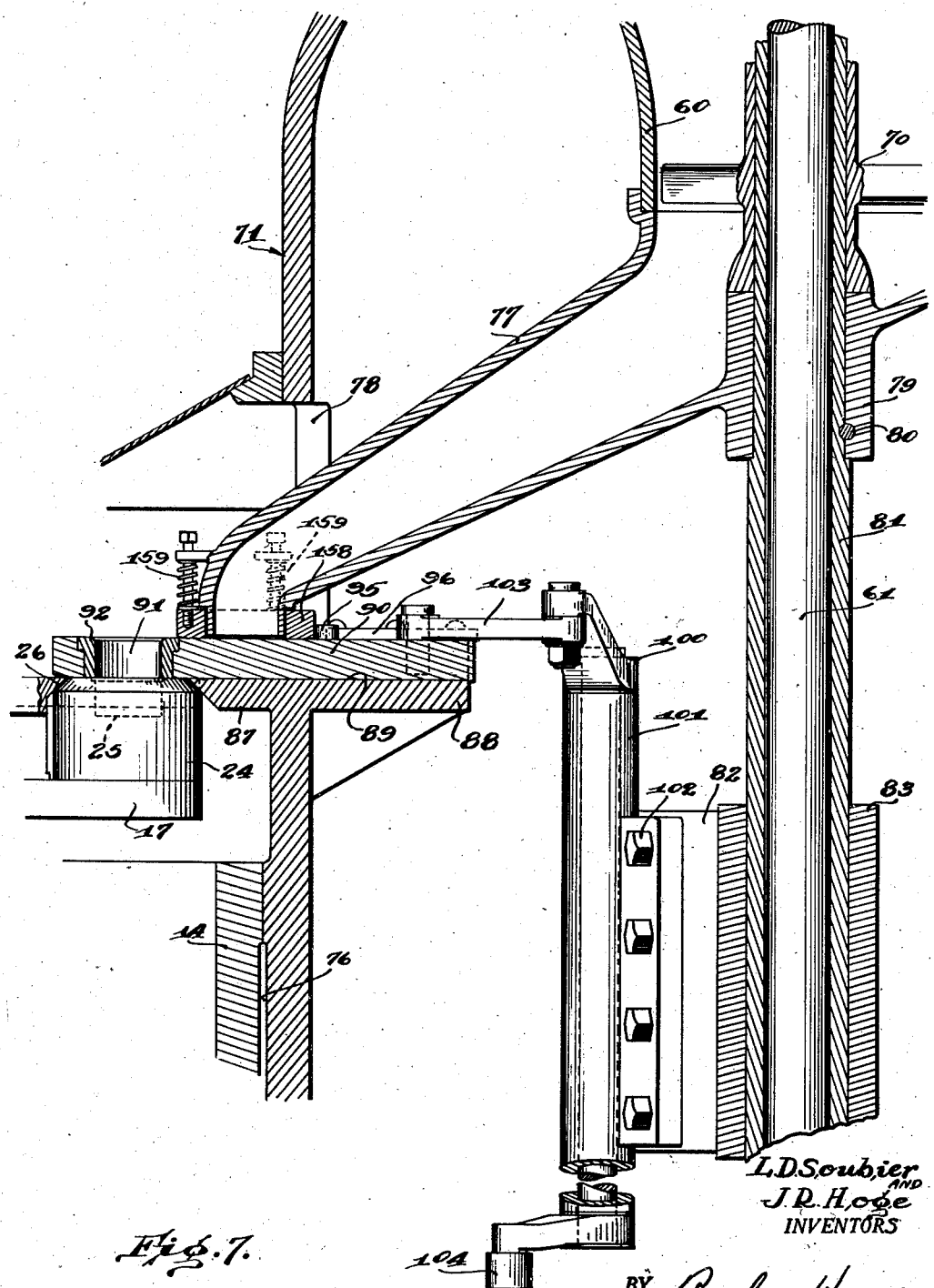

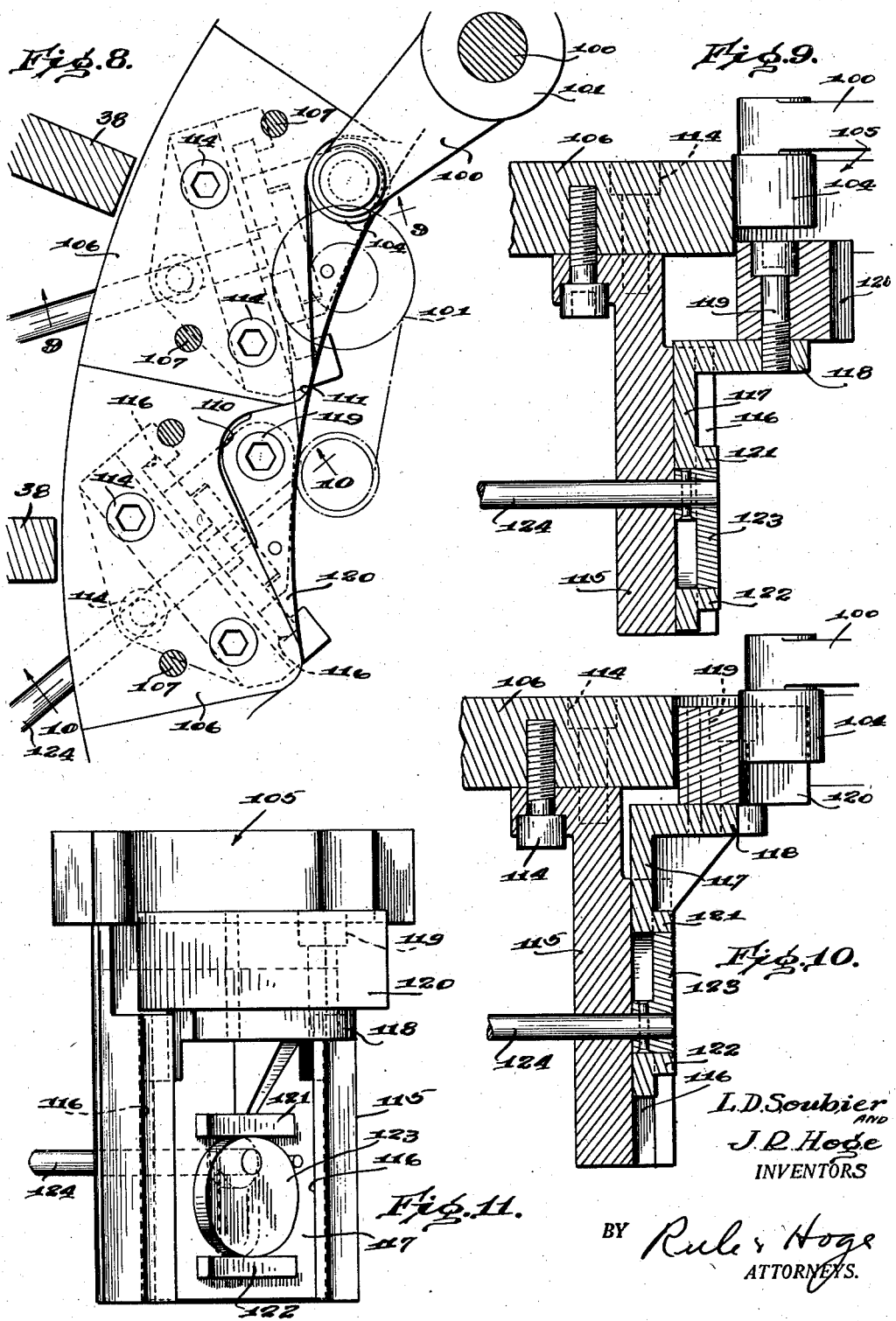

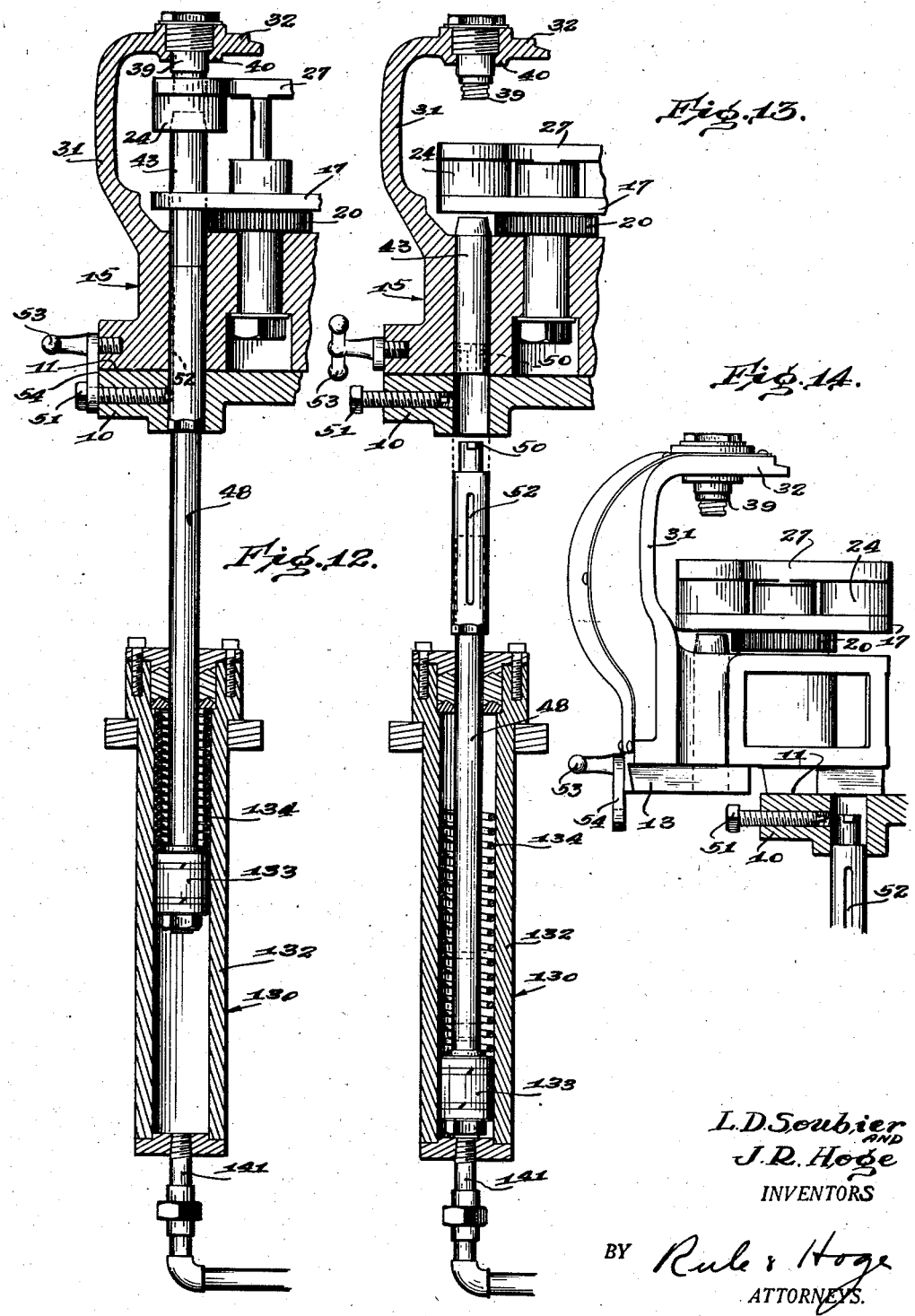

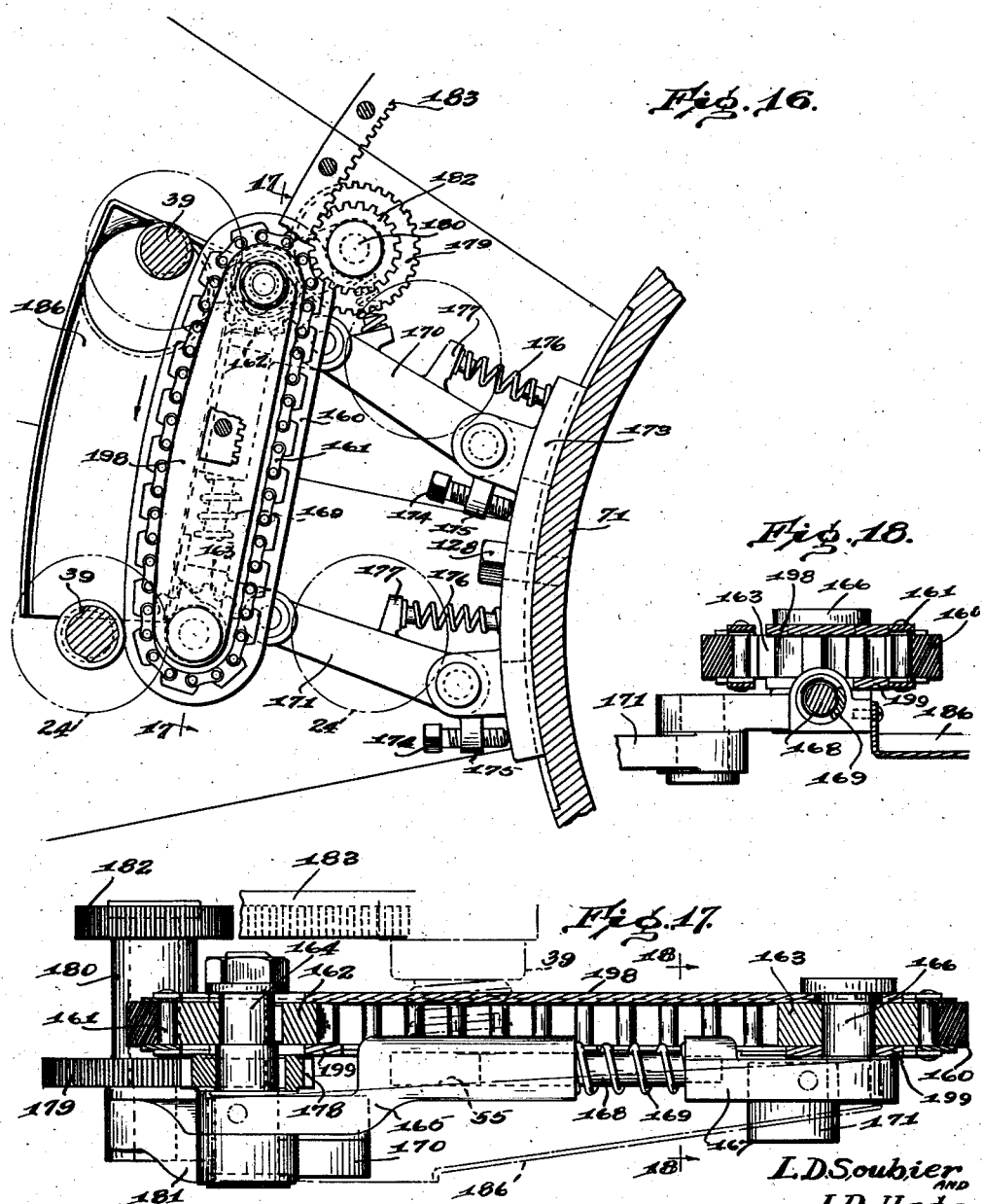

L. D. Soubier
J. D. Hoge
INVENTORS

BY Rule & Hoge
ATTORNEYS.

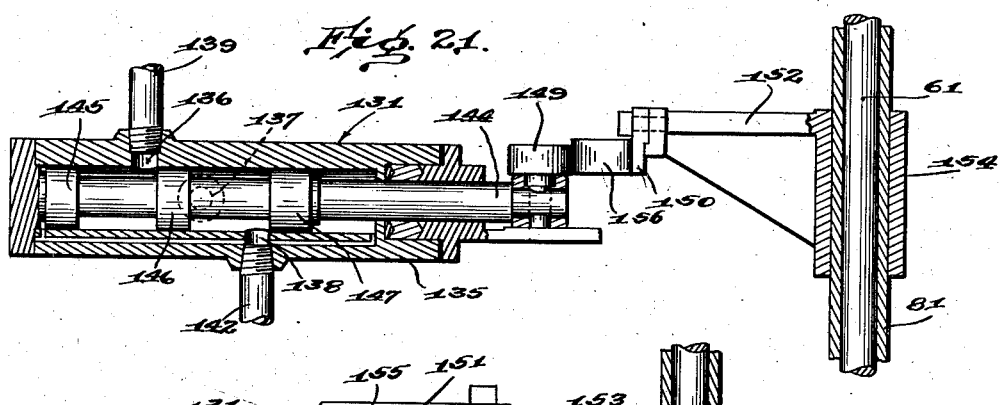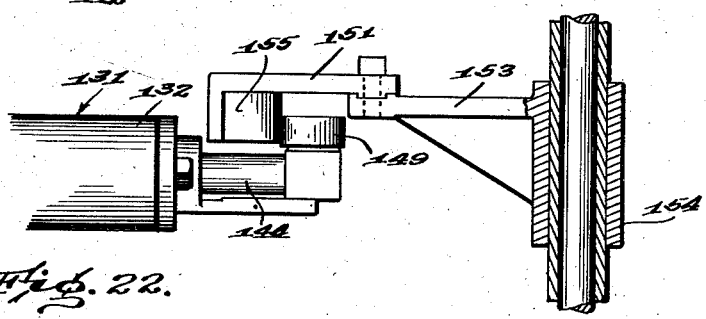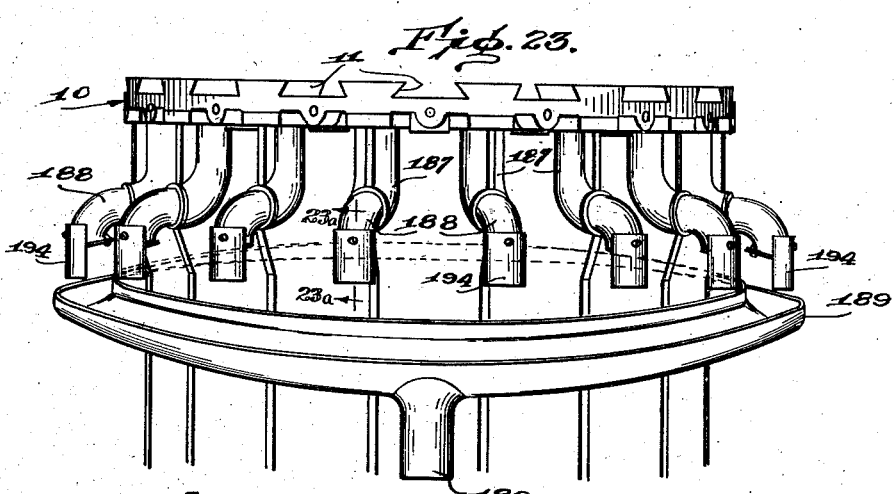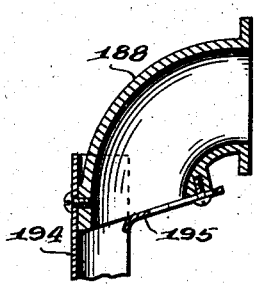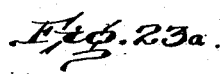

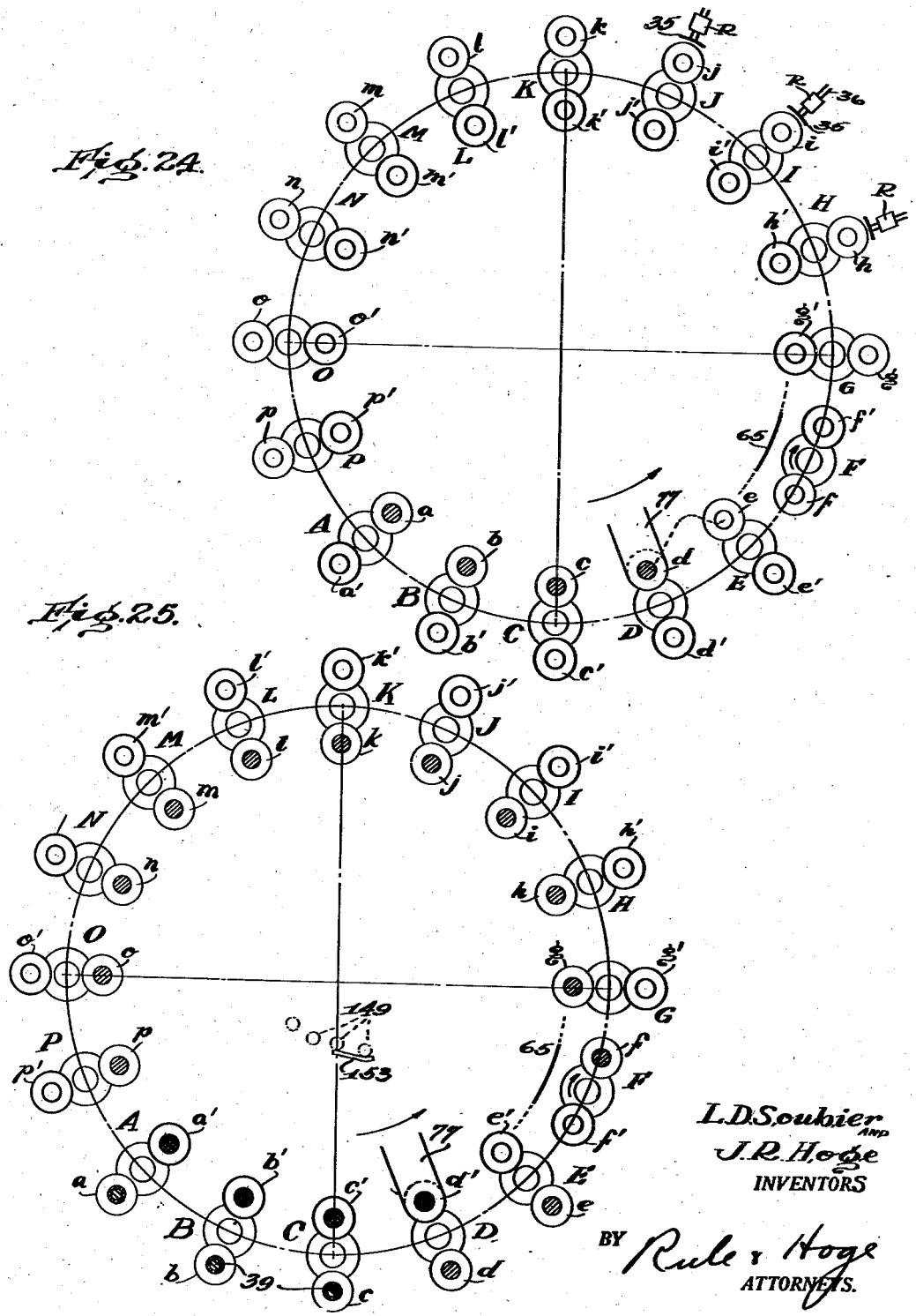

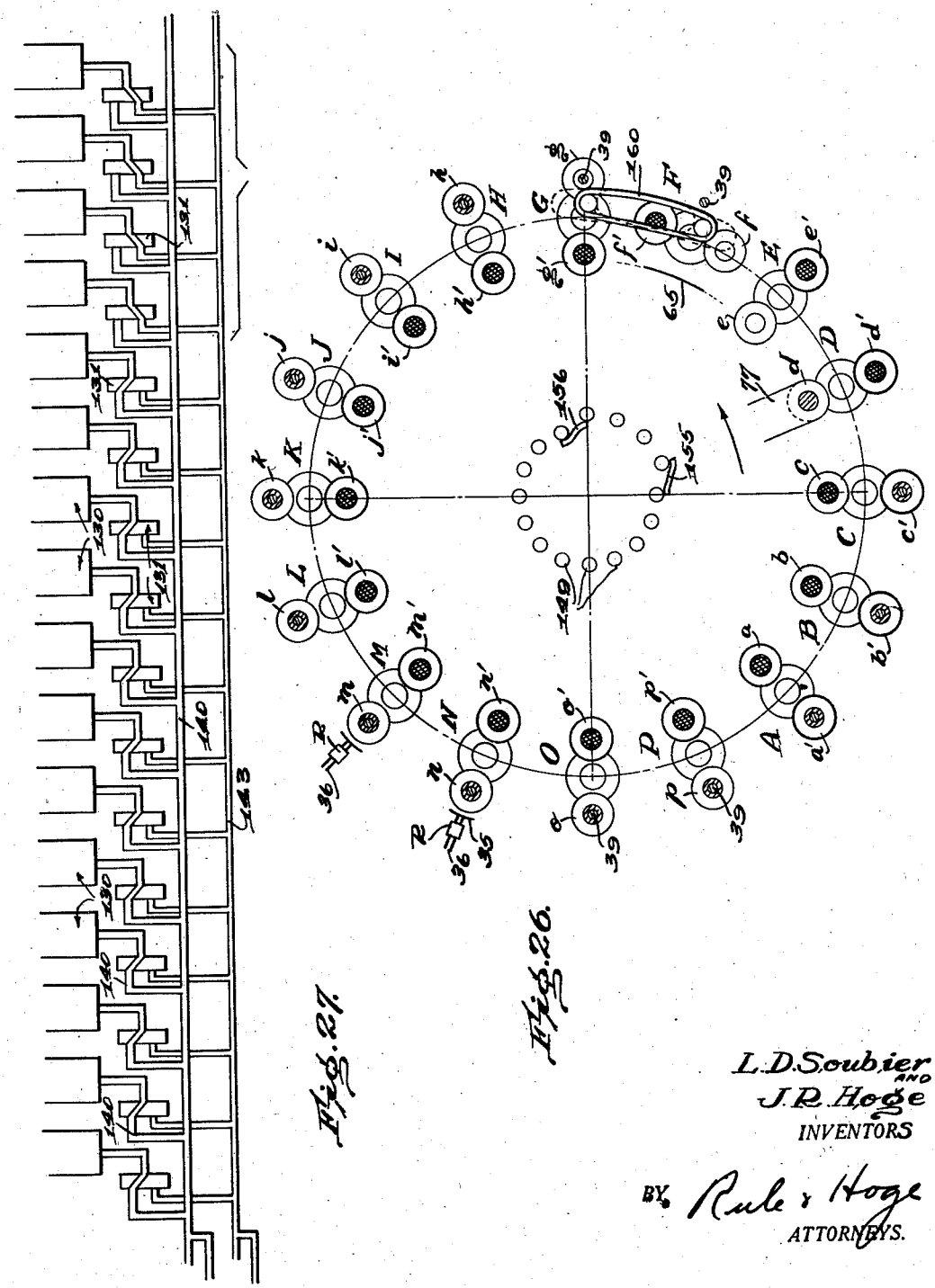

Patented Oct. 15, 1940

2,218,456

UNITED STATES PATENT OFFICE 2,218,456

APPARATUS FOR MOLDING PLASTIC MATERIALS

Leonard D. Soubier and John R. Hoge, Toledo, Ohio, assignors to Owens-Illinois Glass Company, a corporation of Ohio Application February 12, 1938, Serial No. 190,182

15 Claims. (Cl. 18—5)

The present invention relates to an apparatus for curing and molding synthetic resins or natural resins and other types of thermosetting materials capable of being molded and cured by the combined action of heat and pressure. The invention is, without modification, adapted for use in connection with moldable materials in loose powdered or granular form, or with prepared materials which have been compressed into masses commonly referred to as tablets, briquettes, pellets, pills, compresses, wads or preforms.

Briefly, the invention contemplates the provision of a molding apparatus including a series of stationary mold heads contiguously arranged about a vertical axis in the form of a closed ring or circle. Each mold head includes a mold table or carrier upon which there are mounted two or more molds. The table is adapted to periodically be indexed to interchange the position of the molds thereon and bring the same successively from a charging position to a forming position. Means is provided for individually heating the various mold heads. In the charging position the molds receive a charge of moldable material and the charge undergoes a preliminary heating and curing operation in the mold for a predetermined period of time. In the forming position the preheated charge undergoes a secondary heating and charging operation in the mold for a brief period of time and is subsequently subjected to the combined action of heat and pressure for a prolonged period of time until final heat conversion takes place, whereupon the completed article thus formed is discharged from the apparatus.

The objects of the invention are manifold. Among the principal objects thereof is the provision of a molding apparatus of the type set forth above in which the mechanical motions and functions performed by the mold charging, mold indexing, charge forming and article discharging instrumentalities are repeated without alteration during each half-cycle of machine operation, yet in which these motions and functions are performed on different molds and charges therein, thus resulting in an apparatus in which the various stages of machine operation overlap each other in such a manner that during each half-cycle of machine operation completed articles are discharged from one entire set of molds while another entire set of molds become charged.

The apparatus by means of which the above mentioned object may be accomplished is distinguished from the general type of stationary or rotary molding machine wherein the various stages of machine operation follow in sequence and wherein the instrumentalities by means of which each stage is brought about discharge their functions but once during each complete cycle of machine operation. Such machines may well be termed "single phase" machines in that only once during a complete machine cycle do the various operating instrumentalities enter upon their particular phase of activity. The present machine may well be termed a "two phase" machine inasmuch as twice during each machine cycle the various operating instrumentalities become operative.

In carrying out the above mentioned object, the overlapping stages of machine operation permits a material reduction in the size of machine required to produce a given number of articles in a given time. In molding machines, whether stationary or rotary, where the mold heads are centered circumferentially on a circle, such overlapping of the various stages of operation permits the diameter of the machine to be decreased by approximately one-half, thus reducing the floor space to approximately one-fourth of that required for a machine of the same capacity.

Another primary object of the invention is to provide a molding apparatus of the type set forth above in which each mold charge in succession undergoes a preliminary or primary heating and curing stage at a reduced temperature followed by a brief secondary heating and curing stage at an increased temperature, and finally undergoes a prolonged tertiary curing and forming stage at a high temperature and under pressure during which conversion takes place.

Yet another principal object of the invention is to provide such a molding apparatus in which the mold charging, mold indexing, charge forming, and article discharging operations may be advanced or retarded independently of one another to prolong or shorten the primary, secondary or tertiary heating and curing stages as desired, such flexibility and control of operation being conducive toward better results in the final articles and permitting the character of machine operation to be adjusted to accommodate the character of the thermosetting material employed.

It is also a principal object of the invention to provide a molding apparatus including a series of individual mold heads each of which is removable from the apparatus independently of the others, together with means whereby when one or more mold heads are removed from the apparatus, charging or distribution of the moldable material to the region or regions normally occupied by the removed heads may be prevented without affecting the charging and other machine operations. In carrying out these objects, removal of a mold head or heads for the purpose of replacement or repair may be performed without necessitating prolonged shutting down of the apparatus, while prevention of charging of any mold head existing in the machine may be resorted to if for any reason the head fails to function properly and it is not desired to stop production. Also, when preparing to shut down the apparatus, the charging of the mold heads may be successively terminated so that no partially cured or formed charges or articles will remain in the idle machine.

Another object of the invention is to provide a molding apparatus having incorporated therewith novel and efficient means for stripping the formed articles from the mandrels upon which they are formed.

Still another object of the invention is to provide a molding apparatus including a series of indexible mold tables together with novel means for successively indexing the tables to interchange the position of the molds thereon.

The provision, in an apparatus of the type set forth, of a means which will permit the amount of the individual charges delivered to the various molds to be varied; of a means for regulating the temperature of the various mold heads independently and of a means for regulating the flow of air through the mold heads are additional objects that have been carried out in the development of the present invention.

Other objects of the invention, not at this time enumerated, will become apparent as the description, when taken in connection with the accompanying drawings, ensues.

In the drawings:

Fig. 1 is a side elevational view of a molding apparatus constructed in accordance with the principles of the invention.

Fig. 2 is a vertical sectional view taken substantially centrally through the apparatus, certain parts being shown in elevation and other parts being removed for the purpose of clarity.

Fig. 3 is an enlarged fragmentary sectional view taken through one of the molding heads substantially on a radial plane.

Fig. 4 is a fragmentary top plan view of the apparatus, adjacent sectors thereof being shown in horizontal section at decreasing elevations.

Fig. 5 is a sectional view taken substantially along the line 5—5 of Fig. 2.

Fig. 6 is an enlarged fragmentary top plan view of a cam controlled bell crank lever mechanism employed in connection with the present invention.

Fig. 7 is an enlarged fragmentary sectional view taken on a vertical plane and illustrating the manner in which the molds of one head are charged.

Fig. 8 is a sectional view taken substantially along the line 8—8 of Fig. 2.

Fig. 9 is a sectional view taken substantially along the line 9—9 of Fig. 8.

Fig. 10 is a sectional view taken substantially along the line 10—10 of Fig. 8.

Fig. 11 is a fragmentary perspective view of the parts shown in Fig. 9 taken obliquely thereto.

Fig. 12 is a fragmentary vertical sectional view taken through one of the molding heads and through an operating cylinder for elevating the molds to charge forming position.

Fig. 13 is a fragmentary vertical sectional view similar to Fig. 12 showing the cylinder rod dissociated from the mold head to permit removal of the latter from the apparatus.

Fig. 14 is an enlarged detailed fragmentary side elevational view of one of the molding heads showing the same partially removed from the apparatus.

Fig. 16 is a top plan view of a stripping device employed in connection with the present invention.

Fig. 17 is a sectional view taken substantially along the line 17—17 of Fig. 16.

Fig. 18 is a sectional view taken substantially along the line 18—18 of Fig. 17.

Fig. 21 is a fragmentary sectional view taken longitudinally through a control valve employed in connection with the present invention.

Fig. 22 is a detailed side elevational view, partly in section, of the valve shown in Fig. 21.

Fig. 23 is a side elevational view of the means for discharging the formed caps from the apparatus.

Fig. 23a is a sectional view taken substantially along the line 23a—23a of Fig. 23.

Fig. 24 is a diagrammatic view illustrating the manner of charging the molds and of indexing the same during the initial charging cycle of the charging mechanism.

Fig. 25 is a diagrammatic view similar to Fig. 24 illustrating the manner of charging the molds and of indexing the same during the second charging cycle of the charging mechanism.

Fig. 26 is a diagrammatic view similar to Figs. 24 and 25 illustrating the relative positions assumed by the mold charging mechanism; the cap removing mechanism, and the operating mechanism for the control valves shown in Fig. 15, and Fig. 27 is a diagrammatic view of a fluid pressure conduit system employed in connection with the present invention.

*General description*

Figure 19:
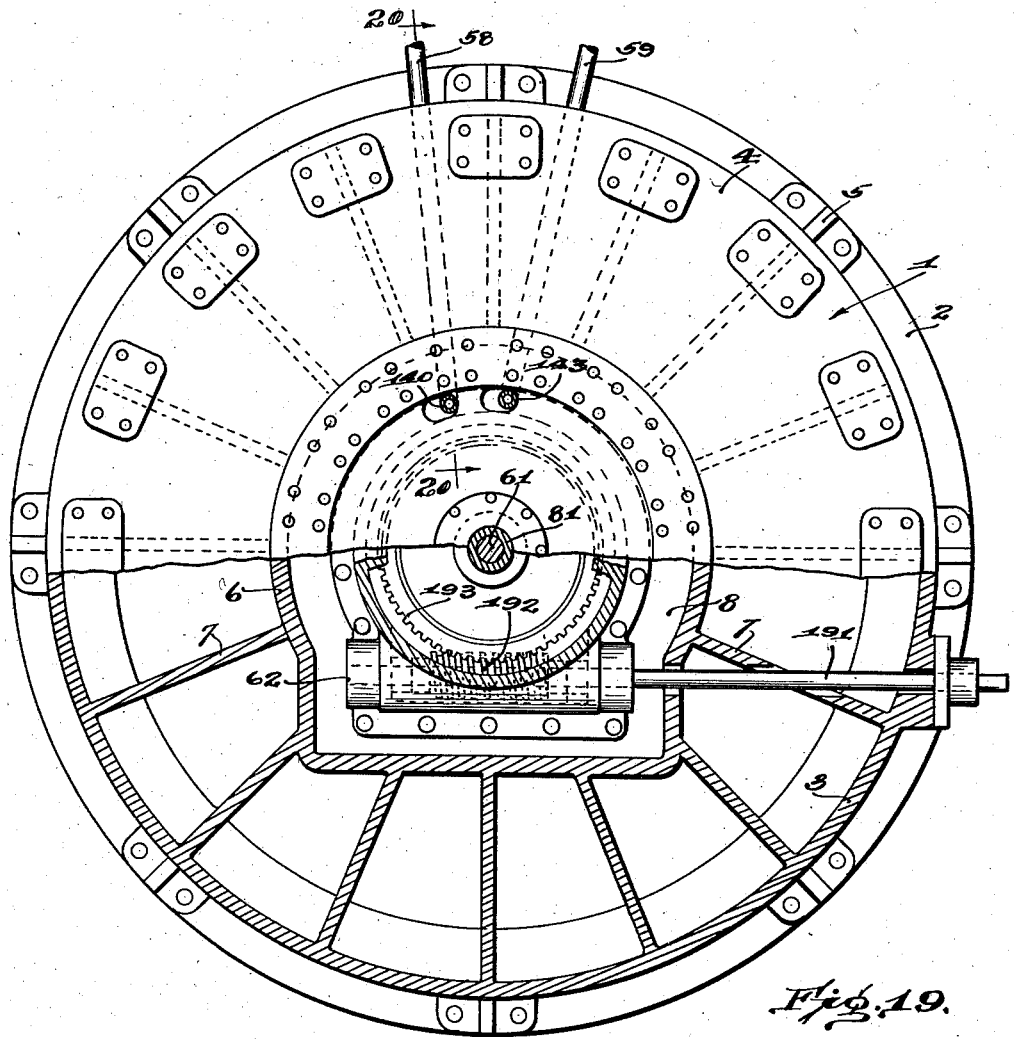
Fig. 19 is a top plan view of the base of the apparatus, a portion of the base cover or top being removed.

The apparatus involves in its general organization a base 1 (Figs. 1, 2 and 19) in the form of an integral casting including a ring-like base plate 2 from which extends upwardly a cylindrical wall 3 having an integral top 4 the upper surface of which is horizontal and provides a circular table or support upon which most of the operative instrumentalities of the apparatus are supported. The cylindrical wall 3 is reinforced in its lower regions by a plurality of circumferentially spaced gusset plates 5 which extend between the wall 3 and base plate 2 exteriorly of the former. An inner wall 6 extends downwardly from the top 4 and is connected to the outer wall 3 by a plurality of radially extending webs 7 which serve to reinforce the base. The inner wall 6 defines a central chamber 8 or pocket in the base 1 in which are contained the driving connections for the apparatus as will appear hereinafter.

Figure 15:
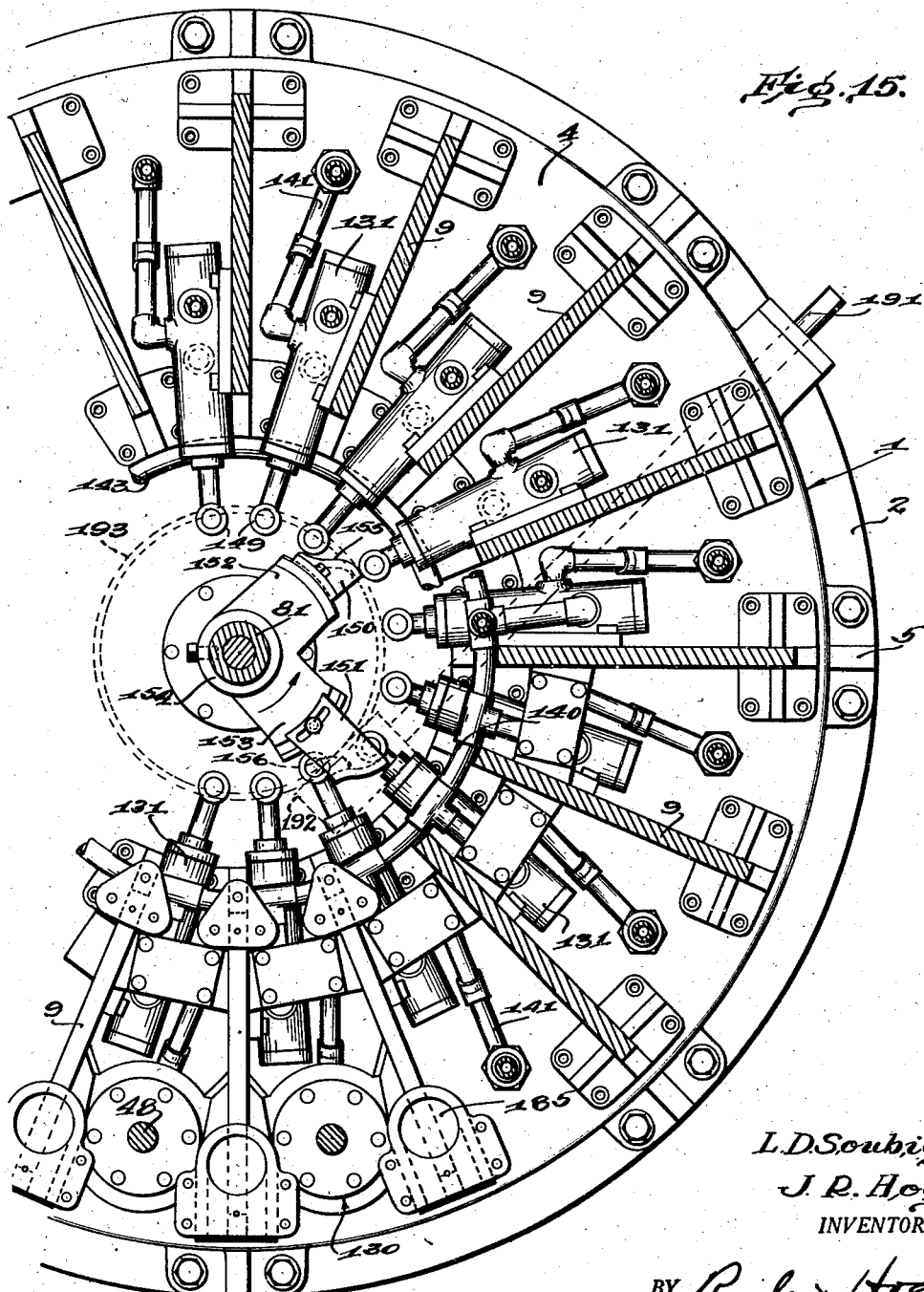
Fig. 15 is a sectional view taken substantially along the line 15—15 of Fig. 2.

Referring now to Figs. 1, 2 and 15, a plurality of web-like supports 9 are secured at their lower ends to the top 4 of the base 1 and extend upwardly therefrom in radial fashion. A supporting ring 10 for the mold heads (see also Fig. 3), the width of which is substantially equal to the radial width of the supports 9, is secured to the upper end of each of the supports and is permanently retained thereon. The ring is in the form of an integral casting having a plurality of radially extending dove-tail grooves 11 (Fig. 1) formed therein. A plurality of mold heads 12 are supported and arranged radially upon the supporting ring 10, each head having formed thereon in the lower regions thereof a tongue 13 which is slidably received in a corresponding dove-tail groove 11. The mold heads 12 are generally of sector shape, being wider in the outer regions thereof than in the inner regions, and, since the heads are arranged contiguously in radial fashion about the apparatus, they, when assembled upon the ring 10, form a closed series extending completely around the central regions of the apparatus. The supporting ring 10 is provided with a circular upstanding wall 14 (Figs. 2 and 3) at its inner edge which limits the innermost positions of the mold heads 12 when operatively assembled upon the ring. The mold heads 12 are individually removable from the ring 10 in a manner and for a purpose subsequently to be set forth in detail.

Mold head construction

The mold heads 12 are identical in construction and therefore a detailed description of one of these heads will suffice for the remainder thereof. Each mold head comprises a casting 15 (Fig. 3) having formed therein a vertically extending bearing 16. A mold table 17, having a hollow shaft extension 18 journalled in the bearing 16, is rotatably mounted on the head 12 and is held in position by means of a nut 19 threadedly received on the lower end of the shaft extension 18. A gear 20, which is keyed to the shaft extension 18 immediately below the mold table 17, cooperates with an indexing mechanism (subsequently to be described) by means of which the mold table 17 is periodically indexed or rotated through an angle of one hundred and eighty degrees on the mold head. In order to accurately maintain the mold table 17 in either of its indexed positions, the gear 20 has a pair of diametrically opposed depressions 21 formed in the underneath side thereof which are adapted to cooperate with a holding detent 22 in the form of a spring pressed ball.

Supported upon the mold table 17 at diametrically opposed positions thereon and seated upon a pair of aligning bosses 23 are a pair of curing molds 24 having mold cavities 25 and surrounding tapered shoulders 26. The molds 24 are normally maintained seated upon the aligning bosses 23 by means of a clamping member 27 (Figs. 3, 4 and 5) having oppositely directed forked portions 28, the underneath sides of which are tapered and extend substantially completely around the molds and seat upon the tapered shoulders 26 thereof. The clamping member 27 is secured to the upper end of a tubular shaft 29 which is slidably disposed within the shaft extension 18 and which is yieldingly held in its lowermost position therein by means of a coil spring 30 disposed within the shaft extension 18 and surrounding the shaft 29. Thus the forked clamping member 27 is normally urged into yielding contact with the two molds 24 and yieldingly maintains them both firmly upon the mold table 17 in their proper diametrically opposed relationship. It is to be noted that the upper surface of the clamping member 27 and the upper surfaces of the molds 24 occupy a common plane, this feature having significance in connection with the mold charging operations as will subsequently be set forth.

The mold head casting 15 is provided with an upwardly extending portion 31 or outer wall which extends inwardly as at 32 and overlies a portion of the mold table 17. A cover plate 33 which is secured to the casting 15 along its upper and lower edges provides a hollow space 34 (Figs. 2 and 3) which may be filled with glass wool or other insulating medium, thereby effectively insulating the mold head 12 against heat losses.

A heating element 35 (Fig. 3) secured to the outer wall 31 is provided with lead in wires 36 which extend through insulators 37 secured to and supported by a strengthening web 38 formed on the wall 31. The lead in wires 36 of each head may be connected through individual rheostats R (Fig. 24 only), thus permitting individual temperature control of the mold heads 12.

A cap forming mandrel 39 (Figs. 2 and 3) is threadedly received in and removably suspended from a boss 40 formed in the portion 32 of the wall 31. Upon successive indexing operations of the mold table 17, the cavities 25 of the molds 24 are successively brought into forming alignment with the mandrel 39.

The underneath side of the molds 24 are provided with tapered recesses 41 therein which, when the molds are seated upon their respective aligning bosses 23, register with openings 42 provided in the mold table 17 at diametrically opposed points thereon centrally of the aligning bosses. The outer mold 24 which is in forming alignment with the mandrel 39 is adapted to be raised from its seat upon the boss 23 and moved into forming engagement with the mandrel 39 against the action of the yielding clamping member 27 as shown in Figs. 2 and 12. Toward this end, a pressure mandrel 43 having a tapered upper end 44 which is complementary to the tapered recess 41 is slidably disposed in a guide 45 which extends completely through the casting 15 in alignment with the forming mandrel 39. The pressure mandrel 43, when in its lowermost inoperative position, terminates flush with the bottom of the casting 15 and is prevented from being withdrawn downwardly through the guide 45 by means of a key 46 (see Fig. 4) which extends into a keyway 47 which terminates short of the bottom of the guide 45. The pressure mandrel 43 is actuated during the forming operation by means of a ram 48 the operation of which will subsequently be described. The ram 48 is slidably disposed in a guide 49 formed in the supporting ring 10 and is connected to the lower end of the mandrel 43 by means of a bayonet slot connection 50. The bayonet slot connection 50 is maintained intact by means of a locking bolt 51 which is threadedly received in the ring 10 and projects inwardly thereof into a slot 52 formed in the ram 48.

Removal of mold heads

The mold head 12 (Figs. 2 and 12) is normally held in position on the ring 10 in contact with the wall 14 thereof against removal by virtue of the aligned guides 45 and 49 through which the connected ram 48 and pressure mandrel 43 extend. The mold heads 12 are also maintained in position on the ring 10 by means of a manually operable locking member 53 (Figs. 12, 13, 14 and 15) which is secured to the casting 15 on the outer side thereof and which is provided with a latch 54 which cooperates with the head of the bolt 51 and prevents the mold from being moved radially of the ring 10. When it is desired to remove any one of the mold heads 12 from the apparatus bodily, the corresponding latch 54 is withdrawn from the bolt 51 by manually turning the locking member 53; the bolt 51 is turned to withdraw the same from the slot 52 in the ram 48; the bayonet slot connection 50 is disconnected; and the ram is lowered to the position shown in Fig. 13. The mold head 12 is thus released and may be moved radially outwardly to withdraw the tongue 13 from the dovetail groove 11 formed in the ring 10 as shown in Fig. 14.

Mold charging mechanism

The mold charging mechanism includes a stationary hopper 60 (Fig. 2) adapted to contain a quantity of the granular moldable material sufficient to fill all of the mold cavities 25 several times. The hopper 60 is generally of funnel shape and occupies a position centrally of the apparatus at the extreme top thereof. The hopper is in part supported from the base 1 by means of a central supporting rod 61 or column, the lower end of which is secured against rotation in a gear casing 62 which is suspended from the underneath side of the top 4 of the base 1. The supporting rod 61 extends vertically upwardly through the top 4 and centrally through the apparatus. The upper end of the rod 61 is threaded and receives thereon the central hub 63 of a spider 64 which extends across the hopper 60 and by means of which the hopper is supported on the rod 61. The hopper is in part supported from the base 1 in the manner just described and is in part supported from the mold head supporting ring 10 by means of a rotary bell-shaped casing 71 having a restricted neck portion 72 which engages the hopper 60 in the medial regions thereof. A circumferential flange 73 formed on the hopper 60 bears against and slips on the upper rim of the casing 71 and thus a part of the weight of the hopper 60 is borne by the casing 71. The casing 71 is centered within the upstanding circular wall 14 of the supporting ring 10 and the lower rim thereof is supported upon an antifriction bearing ring 74 (see also Fig. 3) which in turn is supported upon an inwardly directed ledge 75 formed on the supporting ring 10. The casing 71 fits snugly within the wall 14 and a clearance space 76 provided between the wall 14 and casing 71 reduces frictional wear between these two relatively movable parts. A ring member 56 bridges the gap between the inner end of the inwardly extending portion 32 of the casting wall 31 and the casing 71 and is provided with an insulating cover plate 57 similar to the cover plate 33. A section 58 of the cover plate 57 is removable to permit inspection of the charging mechanism.

Referring now to Figs. 2 and 7, a charging spout 77 which is common to all of the mold heads 12 is swivelled to the lower end of the hopper 60 and extends downwardly and outwardly therefrom and projects through an opening 78 formed in the side of the casing 71. The casing 71 and charging spout 77 are adapted to be rotated in unison in order to bring the lower end of the spout 77 successively into charging relation with the various mold heads 12. Toward this end, the spout 77 is provided with a hub 79 which is keyed as at 80 to an elongated driving sleeve 81 which surrounds the central rod 61 and which is substantially coextensive therewith. The driving sleeve 81 and casing 71 are connected together by means of a spider 82 having a hub 83 secured to the sleeve 81. The outer ends of the radial arms of the spider 83 are provided with face plates 84 which are secured to complementary face plates 85 supported on webs 86 formed integrally on and interiorly of the casing 71. An agitating member in the form of a sleeve 70 keyed to the sleeve 81 and surrounding the same is provided with a series of radial agitating arms designed, upon rotation thereof, to agitate and distribute the moldable material contained in the hopper 60.

The wall of the casing 71 (Fig. 7) is provided with an outwardly extending flange 87 and an inwardly extending flange 88 immediately below the opening 78, the two flanges being in alignment and together providing a horizontal transfer shelf 89, the upper surface of which occupies the same horizontal plane as the upper surface of the forked clamping members 27. The outer end of the flange 87 is complementary to the outer ends of the forked portions 28 of the clamping members 27 (see also Fig. 5) and, when the charging spout 77 occupies a charging relation to any one of the molds 24, the upper surface of the corresponding clamping member 27 and the upper surface of the transfer shelf 89 are substantially continuous, presenting a smooth surface devoid of crevices or voids in which the moldable material might lodge.

The lower end of the charging spout 77 overlies the transfer shelf 89 and a charge transferring member 90 or charging member is slidably disposed upon the transfer shelf 89 immediately below the lower end of the spout 77. The charging member 90 is in the form of a slide having a shouldered opening 91 formed therein near its outer end in which opening a charging element 92 or insert is removably and interchangeably disposed. The charging element 92 is of a size adapted to contain the exact amount of moldable material required in the formation of the final article. The slidable charging member 90 is movable from the dotted line position shown in Fig. 5 wherein the charging element 92 is in alignment with the lower end of the spout 77 to receive a charge of material therefrom, to the full line position of both Figs. 5 and 7, wherein the charging element overlies the mold cavity 25 and deposits its material therein. A sealing member 158 in the form of a ring surrounds the lower end of the spout 77 and by means of springs 159 is caused to bear against the charging member 90 to seal the moldable material and prevent egress of the same around the lower rim of the spout 77. The inner position of the charging member 90 is determined by means of a retaining member 93 (Fig. 5) secured to the flange 88 and provided with a lug 94 designed for engagement with a limit pin 95 provided on the charging member 90. The outer position of the charging member 90 is determined by means of a similar retaining member 96, lug 97, and limit pin 98.

Still referring to Figs. 5 and 7, reciprocation of the charging member 90 in timed relation to the turning movement of the casing 71 and charging spout 77 about the axis of the central supporting rod 61 is controlled by means of a bell crank lever 100 which is mounted for rocking movement in a sleeve 101 which is bolted as at 102 (Fig. 6) to the spider 82. The upper end of the bell crank lever 100 is eccentrically connected to the charging member 90 through a link 103 and the lower end thereof has eccentrically disposed thereon a cam roller 104 designed for engagement with a sectional cam track 1

105 (see also Fig. 2) the individual sections 106 of which are bolted as at 107 (Fig. 8) to a sectional ring 108. The individual sections of the ring 108 are in turn bolted to a series of face plates 109 (Fig. 2) formed on certain of the standards 9. The sectional cam track 105 (Fig. 5), when assembled on the ring 108, presents a series of troughs 110 and crests 111 the contour of which is followed closely by the cam roller 104 by virtue of a coil spring 112 which is connected at one end to the bell crank lever 100 and at the other end to a pin 113 formed or mounted on the flange 88.

From the above description and by reference to Fig. 2 it will be seen that as the casing 71 and charging spout 77 rotate about the axis of the central rod 61, the spider 82 and sleeve 101 move therewith. The bell crank lever 100 is thus caused to oscillate as the cam roller 104 follows the contour of the cam track 105. Oscillation of the lever 100 operates through the link 103 (see also Figs. 5 and 7) to reciprocate the charging member 90 to transfer measured charges of the moldable material from the charging spout 77 to the mold cavities 25 of the various molds 24.

Mold indexing mechanism

The indexing mechanism for the mold tables 17 is shown in Figs. 3 and 5 and comprises a gear segment 65 designed for successive engagement with the respective indexing gears 20 of the mold tables 17 and which is secured to the casing 71 exteriorly thereof by means of an integral attachment bracket 66 having circumferential extending slots 67 formed therein. Clamping bolts 68 extend through the slots 67 and are selectively receivable in a series of circumferentially spaced threaded apertures 69 formed in the casing 71. The distance between adjacent circumferentially spaced apertures 69 is less than the length of the slots 67, and thus the gear segment 65 may be infinitely adjusted on the circumference of the casing 71 to vary the time at which indexing of the mold tables 17 occurs, and consequently vary the duration of the molding cycle as will be set forth later. The number of teeth provided on the gear 20 is precisely two times the number of teeth provided on the gear segment 65 in order that in passing the gear segment 65 will impart rotation to the mold tables 17 throughout one hundred and eighty degrees and reverse the position of the molds 24 thereon.

Mechanism for preventing charging of the mold heads

It has been stated that the individual mold heads 12 are independently removable from the apparatus and the means whereby such removal may be accomplished has previously been fully described. Should for any reason whatsoever (as for example during replacement or repair) one or more mold heads be removed from the apparatus, means is provided for preventing charging or distribution of the moldable material from the charging spout 77 to the region or regions normally occupied by the withdrawn head or heads. Referring particularly to Figs. 8, 9, 10 and 11, each section 106 of the cam track 105 has secured to its underneath side by means of countersunk studs 114 a bracket 115 provided with opposed slideways 116 between which is slidably disposed a vertically slidable carriage 117 provided with a shelf 118. Secured by means of a countersunk stud 119 to the shelf 118 is a cam block 120 which, when the carriage 117 is in its uppermost position, is designed to occupy a position within the void created by the trough 110 in the track section 106. The inner surface (i. e., the exposed surface) of the cam block 120 is uniformly curved, the radius of curvature thereof being equal to its distance from the central supporting rod 61, and thus when the cam block 120 occupies a position within the void created by the trough 110, the cam roller 104 will, in passing, be prevented from entering the trough 110 and will bridge the distance between the adjacent crests 111 as shown in dotted lines in Fig. 8 so that the bell crank lever 100 (see also Fig. 7) will not be rocked about its axis and consequently the charging member 90 will not be actuated. When the carriage 117 is in its lowermost position, the cam block 120 will occupy a position below the level of the cam track 105 as shown in Fig. 11 and the cam roller 104 will enter the trough 110 as shown in full lines in Fig. 8 to actuate the charging member 90 in the manner previously described.

In order that the operator of the apparatus may selectively prevent distribution of moldable material by the charging member 90 to any one of the mold heads 12 or to the region normally occupied by a withdrawn head, each carriage 117 has formed thereon upper and lower contact bars 121 and 122, respectively, between which there is disposed a circular cam member 123. The cam member 123 is eccentrically pivoted by means of an elongated actuating rod 124 to the bracket 115 and a limit stop 125 or pin extending from the carriage 117 in the vicinity of the cam member 123 limits the pivotal movement of the latter in either direction and determines the uppermost and lowermost positions of the carriage 117.

Referring now to Fig. 5, it will be seen that the cam roller 104 which controls the operation of the charging member 90 lags behind the charging member 90, or in other words occupies a radial plane removed from the charging member 90 in a direction opposite to the direction of travel of these members. The actuating rods 124, which control the operation of their respective sets of charge preventing instrumentalities and which are associated with corresponding sections 106 of the cam track 105, extend outwardly from the vicinity of the respective sections 106 with which they are associated and have their outer ends journalled in brackets 158' (Fig. 4) which are secured to the supports 9 and which occupy positions directly in front of the respective mold heads 12, the charging of which they are designed to control. The various supports 9 are provided with openings 127 or passages through which the actuating rods 124 extend. The outer ends of the rods 124 are provided with handles 159' by means of which the rods 124 may manually be turned.

Low temperature and high temperature curing of material in the molds

After each individual mold 24 has been charged, the charge is permitted to remain untouched in the mold for a predetermined period of time and become heated and partially cured therein prior to the final curing and formation thereof into the finished article. During such initial curing of the charge in the mold, the mold occupies a position on its respective mold table 17 at the inner side of the mold head 12. After the charge has been thus subjected to a partial curing operation by the heat generated within the mold head 12 by the heating element 35, the mold table 17 is indexed in the manner previously described and the mold 24 and partially cured charge therein are moved with the table to a position of alignment with the forming mandrel 39 preparatory to the forming operation as shown in Fig. 3. Inasmuch as the mold 24 occupies a position near the inside of the mold head 12 remote from the heating element 35 during the preliminary curing operation and is moved outwardly into alignment with the forming mandrel 39 a short time prior to formation of the charge, a secondary heating and curing operation during which the charge is in close proximity to the heating element 35 and during which the temperature of the charge is increased occurs for a brief period of time immediately prior to the forming operation.

*Charge forming mechanism*

During the actual forming operation, the pressure mandrel 43 is elevated by the ram 48 and the tapered upper end 44 of the mandrel enters the tapered recess 41 of the mold 24, thereby elevating the mold from the mold table 17 as shown in Fig. 12. The partially cured charge is thus brought into forming engagement with the forming mandrel 39.

Referring now to Figs. 2 and 12, actuation of the rams 48 is effected by means of a series of hydraulically operated presses 130 which are mounted upon the supports 9 and which are controlled by means of a series of cam operated valves 131 also mounted upon the supports 9.

Each press 130 comprises a vertically extending cylinder 132 having a piston 133 therein which is mounted on the lower end of a corresponding ram 48. A coil spring 134 disposed within the cylinder 132 normally urges the piston and ram to the lowermost positions thereof and thus maintains the pressure mandrel 43 in its lowermost and inoperative position as shown in Fig. 13.

Figure 20:
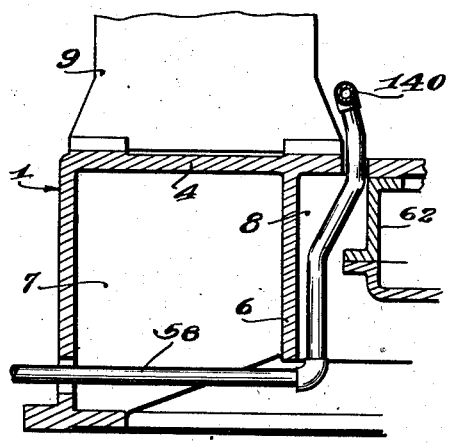
Fig. 20 is a sectional view taken substantially along the line 20—20 of Fig. 19.

The control valves 131 for actuating the presses 130 comprise radially disposed valve casings 135 (Figs. 2 and 21) each of which is provided with ports 136, 137 and 138. The various ports 136 are connected through pipes 139 (see also Fig. 27) to a circular pressure header 140 or manifold having a pipe connection 59 passing through the base 1 (Figs. 19 and 20) and leading from a source of fluid pressure. The ports 137 are connected through pipes 141 (Figs. 12 and 13) to the lower ends of the cylinders 132. The ports 138 are connected through pipes 142 to a drain manifold 143 having a pipe connection 99 (Fig. 19) extending through the base and by means of which the fluid is returned to the source. Slidably disposed within each valve casing 135 is a valve member 144 having spaced sealing members 145, 146 and 147 formed thereon. The valve member 144 extends through a packing gland 148 and projects from the valve casing 135 and the projecting end thereof has mounted thereon a cam roller 149. The cam roller 149 is designed for successive engagement with a pair of cam members 150 and 151 (Figs. 15, 21 and 22) which are adjustably mounted on respective radial arms 152 and 153 integrally formed on a sleeve 154 which is adjustably secured to the rotatable sleeve 81' which is centered upon the supporting rod 61.

The cam member 150 is provided with an outer cam surface 155 which, upon rotation of the cam member 150 in the direction indicated by the arrows, successively engages the various cam rollers 149 and causes the valve members 144 to be fully retracted in the valve casings 135 as shown in Fig. 21. In this position of the valve members 144, the sealing members 146 and 147 occupy positions on opposite sides of the ports 137 and 138 thus connecting the pipes 141 and 142 and permitting the fluid in the cylinders 132 of the presses 130 to be drained and causing the pressure mandrels 43 to be lowered out of engagement with the molds 24.

The cam member 151 is provided with an inner cam surface 156 (Figs. 15 and 22) which engages the cam rollers 149 shortly after they have been released by the cam member 150 and causes the valve members 144 to be extended from the valve casings 135 thus establishing communication between the ports 136 and 137 and connecting the pipes 141 and 139 to admit fluid under pressure to the cylinders 132 as shown in Fig. 12. Upon movement of the pistons 133 upwardly in the cylinders 132, the rams 48 are elevated, thus moving the mandrels 43 into operative pressing engagement with the molds 24 to elevate the latter into forming engagement with the mandrels 39.

*Cap removal mechanism*

Referring now to Figs. 3, 16, 17 and 18, the mechanism for removing or unscrewing the formed caps which adhere to the forming mandrels 39 after the molds 24 have been lowered from the forming operation is disclosed. The cap removal mechanism comprises an endless cap spinning belt 160 which may be formed of leather, rubber, or other flexible material and which is mounted upon and is coextensive with an endless chain 161 mounted upon sprockets 162 and 163. The belt 160 is adapted to successively cooperate with the forming mandrels 39 to frictionally and yieldably engage the formed caps thereon and, by frictional and tangential engagement therewith, apply a torque to the same to spin the caps from the threads formed on the mandrels.

The sprocket 162 is keyed to a shaft 164 which is mounted for rotation in a block 165. The sprocket 163 is mounted for rotation on a pin 166 or stub shaft carried by a block 167. A guide rod 168 has one end thereof anchored in the block 167 and the other end thereof extends into a socket 55 formed in the block 165. A coil spring 169 surrounds the guide rod 168 and serves to urge the two blocks 165 and 167 apart to maintain the chain 161 and spinning belt 160 taut. The blocks 165 and 167 are pivotally connected to the adjacent ends of a pair of links 170 and 171, respectively, while the other ends of the links are pivotally connected to lugs 172 formed on a bracket 173 adjustably secured to the bell-shaped casing 71 by means of clamping bolts 128 which extend through slots 129 formed in the bracket 173 and which are threadedly received in the casing 71. Adjusting screws 174 extend through lugs 175 formed on the links 170 and 171 and bear against the outer surface of the bracket 173 to determine the outer limiting position of the spinning belt assembly. Coil springs 176 disposed between the lugs 177 formed on the links 171 and 170 serve to urge the spinning belt assembly toward its outer limiting position and thus cause the belt 160 to yieldingly engage the various caps on the mandrels 39 in passing. A pair of spaced bearing plates 198 and 199 against which the cap spinning belt 160 bears are provided with outwardly bowed arcuate edges which assimilate inward thrust on the belt 160 when engaged by the caps on the mandrels 39.

The spinning belt 160 is adapted to be driven from the sprocket 162 and toward this end a gear 178 keyed to the shaft 164 meshes with a gear 179 keyed to a shaft 180 which is journalled in one end of a link 181, the other end of which is pivoted to the shaft 164. A gear 182 keyed to the shaft 180 meshes with a ring gear segment 183 secured to the inside of the mold heads 12 and extending completely around the apparatus. Thus it will be seen that as the bell-shaped casing 71 rotates in the direction of the arrow shown in Fig. 16, motion will be imparted to the gear 182, shaft 180 and gear 179, which will in turn be imparted to the gear 178, shaft 164 and sprocket 162 to drive the spinning belt 160 in the direction indicated by the arrow to spin the caps in a clockwise direction as viewed in this figure and remove the same from the mandrels.

Cap discharging mechanism

Referring now to Figs. 5 and 23, the mold heads 12 are provided with complementary recesses 184 in the sides thereof which, when adjacent heads are assembled in the apparatus form therebetween openings 185 through which the caps are adapted to be discharged by gravity when removed from the mandrels 39. A discharge pan 186 (Figs. 3, 16 and 19) carried by the cap spinning mechanism and secured to the blocks 165 and 167 serves to direct the removed caps into the openings 185. The openings 185 register with a series of tubular chutes 187 formed on the supports 9 (see also Fig. 1). Short elbows 188 or extensions are received in the lower ends of the chutes 187 and serve to discharge the caps into a substantially circular trough 189 from whence the caps are conducted by gravity to a discharge chute 190. Shields 194 mounted on the elbows 188 direct the caps into the trough 189.

Regulation of air flow through the mold heads

Referring now to Figs. 2, 4, 23 and 23a wherein the means for regulating the flow of air through the individual mold heads 12 is disclosed, the lower ends of the eblows 188 are provided with adjustable dampers 195 which partially close these ends and restrict the flow of air upwardly through the elbows. Air entering the elbows 188 passes upwardly therethrough and enters the mold heads through the cap discharging openings 185 (Fig. 4) from whence it passes through a series of openings 196 (Fig. 2) formed in the casing 71. A plurality of adjustable dampers 197 are provided in the casing 71 near the top thereof and thus, by regulation of the dampers 195, the air flow to the invidual mold heads 12 may be controlled, while regulation of the dampers 197 serves to control the egress of air leaving the casing 71. In order to prevent flow of air downwardly through the casing 71, an insulating disk 200 closes the apron below the level of the openings 196.

Driving connections for the apparatus

From the above description of the mold charging, indexing, forming, and cap spinning instrumentalities, it is apparent that all of the operative moving parts thereof depend for their operation upon the constant and uniform turning movement of the elongated sleeve 81 about the central supporting rod 61. In order to apply a torque to the sleeve 81 and drive the same at a constant and uniform rate of speed, a drive shaft 191 (Figs. 2 and 12) extends through the outer wall of the base 1, passes through one of the webs 7, extends through the inner wall 6, and enters the gear casing 62. A worm 192 mounted on the shaft 191 within the gear casing 62 meshes with a worm gear 193 mounted on the lower end of the sleeve 81. The drive shaft 191 is adapted to be driven at a constant rate of speed from a suitable electric motor (not shown) or other source of power.

Operation of the apparatus

In the foregoing description, the operation of the mold charging mechanism, the mold indexing mechanism, the charge forming mechanism, and the cap spinning or discharging mechanisms has been set forth in detail and, insofar as practicable, the mechanical relation of these to one another has been pointed out. However, the sequence of operation of these various mechanisms during a complete cycle of operation of the apparatus; the relative time (or times) at which these mechanisms come into operation; and the overlapping operations (so to speak) of the various mechanisms; together with the relation these operations bear to the primary, secondary and tertiary periods of curing time of the material in the molds, has not been described in detail although much advance information of this nature is apparent from the drawings when taken in connection with the foregoing description. Rather it has been deemed advisable to set forth and describe these things at the now opportune time when the construction and operation of the various mechanisms is understood so that such description need not be hampered by digression upon mechanical details.

Referring now to Figs. 24, 25 and 26, a complete molding cycle of the apparatus is represented by two complete revolutions of the charging spout 77 in a counter-clockwise direction as indicated by the arrows. During each revolution of the charging spout 77 the mechanical motions and functions performed by the mold charging, mold indexing, charge forming, and cap spinning instrumentalities are repeated without alteration, yet these operations and functions are performed on different molds and charges therein.

The individual mold heads are designated at A, B, C, D, E, F, G, H, I, J, K, L, M, N, O, and P. The respective molds of the heads A, B, C, etc., are shown at $a$ and $a'$, $b$ and $b'$, $c$ and $c'$, etc. The cycle of operation of the apparatus has arbitrarily been selected as commencing with the charging operation at the mold head A in Fig. 24. In the position illustrated, the charging spout 77 has progressed to the mold head D and thus this figure is representative of the apparatus shortly after the setting up operation when the charging spout has moved approximately 67½ degrees from its initial charging position during the first half-cycle of machine operation. In Fig. 25 the charging spout 77 has progressed around the mold head series one complete revolution from the position shown in Fig. 24 and has returned to the mold head D or has rotated approximately 67½ degrees during the second half-cycle of machine operation, having travelled approximately 427½ degrees altogether from the initial charging position. In Fig. 26 the charging spout has completed a full machine cycle having made two complete revolutions, and has progressed approximately 67½ degrees to the mold D in the second machine cycle or has commenced its fifth revolution.

As the charging spout 77 progressively passes each of the mold heads 12, the charging member 90 (Fig. 7) is caused to segregate and transfer a charge of the moldable material from the hopper 60 to the inner molds thereof. Thus in Fig. 24 the charging spout 77, having progressed from the mold head A to the mold head D, the inner molds a, b, c and d have been charged.

The indexing segment 65 (Fig. 5) is circumferentially adjusted on the side of the bell-shaped casing 71 in advance of the charging spout 77 in such a manner that the mold tables 17 of the various mold heads 12 become indexed a short time prior to arrival of the charging spout thereat. Thus in Fig. 24 the mold table of the mold head F is in the act of becoming indexed to bring the mold f thereof into position for registry with the oncoming charging member.

When the charging spout 77 arrives at the various mold heads 12, having completed the first revolution thereof in the first half-cycle of machine operation, the inner mold of each mold table will have been presented to the charging spout and charged thereby. Thus in Fig. 25, the spout 77 having rotated approximately 67½ degrees in excess of one complete revolution and the apparatus thus being in the second half-cycle of operation, all of the molds a, b, c, etc., have been charged and in addition the mold tables 17 of the mold heads A, B, C and D have been indexed and the molds a, b, c and d thereof charged. The charged molds a, b, c and d occupy positions on the outer side of their respective mold heads.

During the interval of time from the charging of the various molds 24 until the mold tables on which they are mounted are indexed, the tables remain stationary and the material in these molds undergoes a preliminary heating and curing operation.

The sleeve 154 (Fig. 15) is adjusted on the central rotating sleeve 81 and the cam member 150 is adjusted on the sleeve 154 in such a manner that the cam member 150, which cooperates with the control valves 131 (Fig. 2) to actuate the rams 48 and bring the molds into forming engagement with the forming mandrel 39, comes into operation shortly after the indexing operation has taken place. Thus in Fig. 25, the cam member 150 is in radial alignment with the mold head C and the outer mold c is in forming engagement with the mandrel 39.

During the interval of time from the indexing of the mold tables 17 until the molds are brought into forming cooperation with the respective mandrels 39, a brief secondary heating and curing operation in which these molds are in close proximity to the heating elements 35 (Fig. 3) takes place. The charges in the molds d and e in Fig. 25 are shown in this brief secondary heating and curing stage.

The cam member 151 (Fig. 15) which cooperates with the control valves 131 to actuate the rams 48 and lower the molds out of forming engagement with the forming mandrels 39, is adjusted with respect to the cam member 150 to come into operation after the molds and mandrels have remained in forming engagement during a predetermined period of forming and curing time. As shown in Fig. 26, this tertiary period of forming and curing time commences when the molds are brought into forming engagement with the mandrels 39 by the action of the cam member 150 upon the control valves 131 as indicated at the mold head C, and terminates after the charging spout has rotated through an angle of approximately 270 degrees and the cam member 151 restores the control valves to their original position as indicated at the mold head G. Since in Fig. 26, the charging spout has rotated approximately 67½ degress in excess of the second revolution thereof and the apparatus has commenced its second complete cycle, with the charging spout in register with the mold head D, the entire set of molds, a, b, c, etc., and a', b', c', etc., have been charged, and in addition the molds a, b, c and d have passed through the tertiary forming and curing stage; the formed articles have been removed from the mandrels 39; the mold tables of the heads A, B, C and D have been indexed; and the molds a, b, c and d have been restored to their original position and charged.

The position of the bracket 173 (Fig. 16) of the cap spinning mechanism is adjusted on the casing 71 in such a manner that the cap spinning instrumentalities come into operation on the formed caps immediately prior to the indexing operation and after the predetermined tertiary period of forming and curing time has expired. In Fig. 26, the cap spinning mechanism is commencing its cap removal operation in cooperation with the mold head G at a position approximately 270° removed from the mold head C where the forming operation on the charge in the mold c' has commenced. After the cap spinning mechanism removes the caps from the various mandrels 39 in passing, the caps are discharged in the manner previously described into the chute 190 (Fig. 23) and immediately thereafter the mold tables 17 are indexed and the empty molds presented to the charging spout 77 for refilling.

*Machine adjustments and modifications*

It is to be noted that while the sequence of operation of the mold charging, mold indexing, charge forming, and cap spinning operations remains the same, the relative time (or times) at which these operations commence and terminate may be varied, thus varying the prolonged initial heating and curing stage, the brief secondary heating and curing stage, and the tertiary forming and curing stage as desired. By shifting the position of the attachment bracket 66 (Fig. 5) around the periphery of the bell-shaped casing 71 in the direction of travel of the spout 77, the indexing operation may be advanced to shorten the preliminary heating and curing period or lengthen the secondary heating and curing period. By shifting the position of the attachment bracket 66 in the other direction the preliminary period may be shortened and the secondary period lengthened. Similarly, the forming operation may be advanced or retarded by shifting the angular position of the sleeve 154 (Fig. 15), thus lengthening or shortening the tertiary forming and curing period at the expense of the secondary heating and curing period or vice versa. Finally, the cap spinning operation may be retarded or advanced to lengthen or shorten the forming period by shifting the position of the bracket 173 (Fig. 7) around the periphery of the bell-shaped casing 71 in one direction or the other as the case may be.

It should also be noted that inasmuch as the various mold heads 12 are independently removable (see Figs. 12, 13 and 14), without requiring cessation of the operation of the machine, the machine may continue to operate while any of the mold heads 12 are undergoing repair or while mold substitution is being effected.

Modifications may be resorted to within the spirit and scope of the appended claims.

We claim:

1. In an apparatus for molding articles from synthetic resins or like moldable materials, an annular series of fixed mold heads arranged in contiguous relationship about a central axis, means whereby said heads may be selectively withdrawn from the series, a mold for each head, means including a rotary spout movable into charging relation to each head to bring a supply body of moldable material into proximity thereto, means for rotating the spout, means operable upon rotation of the spout for transferring a measured charge of the material from the supply body to the mold of each head when the spout is in charging relation thereto, and means for rendering said transferring means inoperative to transfer a charge of the material to the region normally occupied by a withdrawn head.

2. In an apparatus for molding articles from synthetic resins or like moldable materials by the application of heat and pressure, an annular series of molding and heating heads, a mold table disposed within each head, a plurality of molds disposed on each mold table, a hopper for the moldable mterial including a charging spout, means for continuously moving the spout past said heads in succession, means for successively transferring a measured charge of the material from the spout to a point within each head as said spout passes said heads, means synchronized with the movement of the spout for indexing said mold tables successively to bring the molds carried thereby successively into position to receive a charge of material from the spout, and means for advancing or retarding the indexing of said mold tables.

3. An apparatus for molding articles from synthetic resins or like moldable materials by the application of heat and pressure comprising in combination a frame, an annular series of molding heads carried by said frame, a heating chamber associated with each head, a mold disposed within each heating chamber, a hopper for the moldable material including a charging spout, means for continuously moving the spout past said heads in succession, means for successively transferring a measured charge of the material from the spout to the respective mold of each head as the spout passes the heads, a forming mandrel in each heating chamber, and means individual to each heating chamber and synchronized with the movement of the spout for successively moving said molds bodily into forming engagement with said mandrels to shape the charges therein into the desired articles after a predetermined period of curing time has elapsed since the charging of the molds.

4. An apparatus for molding articles from synthetic resins or like moldable materials by the application of heat and pressure comprising in combination a frame, an annular series of molding heads carried by said frame, a heating chamber associated with each head, a mold disposed within each heating chamber, a hopper for the moldable material including a charging spout, means for continuously moving the spout past said heads in succession, means for successively transferring a measured charge of the material from the spout to the respective mold of each head as the spout passes said heads, a forming mandrel in each heating chamber, means individual to each heating chamber and synchronized with the movement of the spout for successively moving said molds bodily into forming engagement with the mandrels to shape the charges therein into the desired articles after a predetermined period of curing time has elapsed since the charging of the molds, means for withdrawing said molds from such forming engagement, and means operable upon such withdrawal for removing the formed articles from said mandrels.

5. An apparatus for molding articles from synthetic resins or like moldable materials by the application of heat and pressure comprising in combination a frame, an annular series of molding heads carried thereby, a heating chamber associated with each head, a mold disposed within each heating chamber, a hopper for the moldable material including a charging spout, means for continuously moving the spout past said heads in succession, means for successively transferring a measured charge of the material from the spout to the respective mold of each head as the spout passes the heads, and forming means individual to each heating chamber and operable therein and synchronized with the movement of the spout for successively shaping the charges in said molds into the desired articles after a predetermined period of curing time has elapsed since the charging of the molds.

6. An apparatus for molding articles from synthetic resins or like moldable materials by the application of heat and pressure comprising in combination a frame, an annular series of molding heads carried thereby, a heating chamber associated with each head, a mold disposed within each heating chamber, a hopper for the moldable material including a charging spout, means for continuously moving the spout past said heads in succession, means for successively transferring measured charges of the material from the spout to the respective mold of each head as the spout passes the heads, forming means individual to each heating chamber and operable therein and synchronized with the movement of the spout for successively shaping the charges in said molds into the desired articles after a predetermined period of curing time has elapsed since the charging of the molds, and means for collectively lengthening or shortening said period of curing time.

7. An apparatus for molding articles from synthetic resins or like moldable materials by the application of heat and pressure comprising in combination a frame, an annular series of molding heads carried by said frame, a movable mold table disposed within each head, a pair of molds positioned on each table, a hopper for the moldable material including a charging spout, means for repeatedly and successively moving said spout past said heads in succession, means for successively transferring a measured charge of the material from the spout to a point within each head as the spout passes the heads, a forming mandrel in each head, the molds of each head being movable with their respective tables from a charge receiving position to a position of alignment with the respective forming mandrel in the head, and means synchronized with the movement of the spout for successively indexing the mold tables to interchange the position of the molds thereon.

8. In an apparatus for molding articles from synthetic resins or like moldable materials by the application of heat and pressure, an annular series of molding and heating heads, a mold table disposed within each head, a plurality of molds disposed on each mold table, a hopper for the moldable material including a charging spout, means for continuously moving the spout past said heads in succession, means for successively transferring a measured charge of the material from the spout to a point within each head as said spout passes said heads, and means synchronized with the movement of the spout for indexing said mold tables successively to bring the molds carried thereby successively into position to receive a charge of material from the spout.

9. In an apparatus for molding articles from synthetic resins or like moldable materials by the application of heat and pressure comprising in combination a frame, an annular series of relatively fixed molding heads carried by the frame, a mold carried by each head, a hopper for the moldable material, a charging spout for the hopper mounted for swinging movement about the axis of the series of heads and movable into charging relation with the molding heads in succession upon rotation thereof, means for rotating said spout, and means operable upon rotation of the spout for delivering a measured charge of material from the spout to the molds of each head.

10. In an apparatus for molding articles from synthetic resins or like moldable materials by the application of heat and pressure comprising in combination a frame, an annular series of relatively fixed molding heads carried by the frame, a mold carried by each head, a hopper for the moldable material, a charging spout for the hopper mounted for swinging movement about the axis of the series of heads and movable into charging relation with the molding heads in succession upon rotation thereof, means for rotating said spout, and cam operated means operable upon rotation of the spout for delivering a charge of material from the spout to the molds of each head.

11. In an apparatus for molding articles from synthetic resins or like moldable materials by the application of heat and pressure, a hopper for moldable material, an annular series of mold heads centered about the axis of the hopper, a mold for each head, a charging spout in communication with the hopper and swivelled thereto for rotary movement about the axis thereof, means for rotating said spout, and means operable upon rotation of the spout for successively transferring a measured charge of moldable material from the spout to the respective mold of each head.

12. In an apparatus for molding articles from synthetic resins or like moldable materials by the application of heat and pressure, a hopper for the moldable material, an annular series of mold heads centered about the axis of the hopper, a mold for each head, a charging spout in communication with the hopper and swivelled thereto for rotary movement about the axis thereof, a transfer shelf movable with the spout and positioned immediately below the discharge end thereof, a charge transferring member mounted for reciprocation on said shelf and movable from a position in register with the discharge end of the spout to a position in register with each mold, and means operable upon rotation of the spout for reciprocating the charge transferring member.

13. In an apparatus for molding articles from synthetic resins and like moldable materials by the application of heat and pressure, a series of fixed molding heads, each head including a heating chamber, means for heating the chambers, means for bringing a supply body of moldable material into the proximity of each head, means for transferring a measured charge of the material from the supply body to the mold of each head when the supply body is in proximity thereto, a forming mandrel for each head, means for moving the molds of each head bodily into forming engagement with the mandrel thereof, and means common to all of the heads for removing the formed articles from the forming mandrel.

14. In an apparatus for molding articles from synthetic resins and like moldable materials by the application of heat and pressure, a series of fixed molding heads arranged in contiguous relationship about a central axis, means for heating said heads, a mold in each head, means mounted for rotation about said axis for bringing a supply body of moldable material into the proximity of successive mold heads of the series, means for transferring a measured charge of material from the supply body to the mold of each head when the supply body is in proximity thereto, a forming mandrel in each head, means for moving the molds of each head into forming engagement with the mandrel thereof, and means common to all of the heads and mounted for revolution about said axis for removing the formed articles from the forming mandrel.

15. In an apparatus for molding articles from synthetic resins, an annular series of fixed molding heads, a container for a supply body of moldable material, and means for successively transferring a measured charge of the material from the supply body to the mold of each head.

LEONARD D. SOUBIER.
JOHN R. HOGE.